2,816,882

POLYMERIC SURFACE ACTIVE AGENTS

Arthur M. Schiller, Stamford, Conn., assignor to American Cyanamid Company, New York, N. Y., a corporation of Maine No Drawing. Application January 22, 1954, Serial No. 405,660

3 Claims. (Cl. 260—86.1)

This invention relates to a new class of chemical compounds and more particularly to a new class of organic chemical compounds especially adapted to be non-ionic surface active agents useful in emulsification, textile softening, antiredeposition of dirt in laundering, stabilization of emulsions and suspensions, and in various agricultural uses such as for wettable insecticides, as well as for any of the uses for which non-ionic surface active agents are applicable.

In certain classes of industries, there is a need for chemical compounds which are normally used in relatively small quantities but which are capable of use in higher concentrations to secure a surface-active effect which is principally the result of a wetting action, such as at a water-oil interface.

In the textile-, paper-, leather-treating and related industries, for example, there are many situations wherein a wetting, stabilizing or emulsifying action is necessary and many different chemical compounds and compositions have been produced which are intended to reduce surface tension and promote such desired action.

The use of prior art compounds and compositions has found substantial application in these industries and many of these compounds have been found to be extremely valuable in the art. However, there still remains considerable room for improvement and advancement of the art and it is a principal purpose of the present invention to provide a new class of chemical compounds especially adapted for such purposes and calculated to provide an agent capable of use with considerable success in the industry.

It is generally considered that, in order to effect a reduction of the surface tension of an aqueous solution of the interfacial of a water-oil dispersion or the like, the agent employed should be readily capable of becoming concentrated in the surface layer or the interfacial layer of the solution or dispersion, respectively, and becoming oriented therein. To be active in this manner, the molecule is usually possessed of, first, a hydrophilic group, such as a hydroxyl, sulfate, or sulfonate radical and, second, a lipophilic group, such as a hydrocarbon radical.

The hydrophilic portion of the molecule has marked affinity for water; is easily wetted by aqueous media; and, in general, tends to cause the molecule of which it is a part to orient itself so that the hydrophilic group may stand in relatively closer proximity to the water medium or phase, as contrasted to the oil phase.

The lipophilic group has marked affinity for oils and fats; is readily capable of being wetted by oleaginous media; and, in general, tends to cause the molecule of which it is a part to orient itself so that the lipophilic groups may stand in relatively closer proximity to the oil medium or phase, as contrasted with the aqueous medium.

I have discovered a new class of chemical compounds which possesses such groups and which exhibits these desirable surface-active properties. This class consists of the copolymers of acrylamide or methacrylamide and an acrylic or methacrylic acid ester of a higher molecular weight saturated aliphatic alcohol having at least 8 carbon atoms.

These copolymers generally may be prepared by any of the more familiar methods of polymerization now known in the art, such as solution, emulsion (in water), suspension and bulk polymerization. The polymerization may be carried out in the presence of any suitable catalyst, such as peroxygen compounds, oxidizing agents, redox systems, etc. The temperature of the reaction may range from as low as room temperature up to as high as the reflux temperature of the media employed and the specific temperature preferred in any one case depends upon the particular circumstances involved, the nature and characteristics of the particular monomers used, the activity of the catalyst involved, and so forth.

The proportions of the monomers used in the formation of the copolymers may be varied within relatively wide ranges but it has been found that, in order to develop the desirable surface active properties and water-soluble characteristics, from less than 1 part up to about 15 parts by weight of the alkyl ester of the acrylic or methylacrylic acid can be polymerized with from more than 99 parts down to about 85 parts by weight of the acrylamide or methacrylamide. The specific proportions on monomers used in any particular case, will, of course, depend primarily on the hydrophobic or hydrophilic characteristics or properties desired in the resulting copolymer, upon their intended use, and so forth.

Similarly, the specific alcohol used to form the acrylic or methacrylic acid ester may be any alcohol having a straight or branched carbon chain of at least eight carbon atoms and its selection will depend upon the desired characteristics and properties of the copolymer to be prepared. Aliphatic alcohols having a shorter chain length than eight carbon atoms are not applicable within the specific concepts of the present invention insomuch as they do not form suitable esters capable of forming copolymers having the requisite surface active properties. Alcohols such as octanol, nonanol, decanol, hendecanol, 2-methyl 1-nonanol, as well as alcohols having longer chain length up to 22 carbon atoms such as tridecanol, tetradecanol, hexdecanol, octadecanol, etc., are applicable within the broad principles of the present invention inasmuch as they are capable of providing the necessary hydrophobic properties and the specific alcohol employed will be determined by the particular requirements of the individual case.

It is thus seen that the specific surface-active characteristics of the compounds of the present invention may be varied by suitable selection of the proportions of the monomers as well as the individual nature and chemical constitution of the monomers themselves.

In the following more specific description of the invention, the monomeric compounds which will be used to illustrate the invention will be acrylamide and the lauryl ester of methacrylic acid. It is to be pointed out, however, that such compounds have been selected primarily for illustrative purposes and that the invention in its broader aspects is not to be construed as limited thereto.

Example 1

| Materials: | Parts |
|---|---|
| Acrylamide | 45 |
| n-Lauryl methacrylate | 5 |
| Dioxane | 450 |
| Benzoyl peroxide | 0.5 |

The above ingredients were charged into a suitable reaction vessel equipped with a stirrer, a thermometer and a reflux condenser. The reaction mixture was heated to reflux temperature (101° C.) and maintained at that temperature for a period of approximately 60 minutes. The batch was then cooled and the reaction product was separated by filtration from the mother liquor. The reaction product was then dried under vacuum and a fine, white powder (approximately 50 parts) was obtained. The powder was water-soluble.

*Example 2*

| Materials: | Parts |
|---|---|
| Acrylamide | 49.5 |
| n-Lauryl methacrylate | 0.5 |
| Dioxane | 450 |
| Benzoyl peroxide | 0.5 |

The procedures set forth in Example 1 were followed substantially as described therein. The resulting product was obtained as a fine, white powder (approximately 50 parts) which was more water soluble than the product of Example 1, due to the higher proportion of acrylamide.

*Example 3*

| Materials: | Parts |
|---|---|
| Methacrylamide | 45 |
| n-Lauryl methacrylate | 5 |
| Dioxane | 450 |
| Benzoyl peroxide | 0.5 |

The procedures set forth in Example 1 were followed substantially as described therein except that methacrylamide was used instead of acrylamide. The resulting product was obtained as a fine, white powder (approximately 50 parts).

*Example 4*

| Materials: | Parts |
|---|---|
| Acrylamide | 42.5 |
| n-Lauryl methacrylate | 7.5 |
| Dioxane | 450 |
| Benzoyl peroxide | 0.5 |

The procedures set forth in Example 1 were followed substantially as described therein. The resulting product was obtained as a fine, white powder (approximately 50 parts) which was less water-soluble than the product of Example 1, due to the lower proportion of acrylamide.

Surface tension measurements were taken on aqueous solutions of the product of Example 1 at various concentrations. (Temperature—25° C.; age of surfaces—5 seconds.)

| Percent copolymer: | Surface tension—dynes/cm. |
|---|---|
| 0.00 | 71.1 |
| 0.01 | 50.0 |
| 0.05 | 47.9 |
| 0.10 | 51.6 |
| 0.50 | 49.2 |
| 1.00 | 47.7 |
| 5.00 | 47.2 |

The percentage by weight of the particular copolymer used in any specific purpose or function depends, of course, upon the properties and characteristics of the copolymer itself, the effect to be obtained, the nature and use of the solution to be so affected, etc. As low as 0.01% by weight has been found useful in surface tension uses and as high as 15–20% by weight has been found useful where such concentrations are desired.

Although I have described several specific examples of my inventive concept, I consider the same not to be limited thereby nor to the specific substances mentioned therein but to include various other compounds of equivalent constitution as set forth in the claims appended hereto. It is understood that any suitable changes, modifications and variations may be made without departing from the spirit and scope of the invention.

What I claim is:

1. A surface active agent comprising a copolymer of from about 85 to about 99 parts by weight of a member of the group consisting of acrylamide and methacrylamide and from about 1 to about 15 parts by weight of an alkyl ester of an acid from the group consisting of acrylic and methacrylic acids, the alkyl group in said esters containing from eight to twenty-two carbon atoms.

2. A surface active agent comprising a copolymer of from about 85 to about 99 parts by weight of acrylamide and from about 1 to about 15 parts by weight of lauryl methacrylate.

3. A surface active agent comprising a copolymer of from about 85 to about 99 parts by weight of methacrylamide and from about 1 to about 15 parts by weight of lauryl methacrylate.

References Cited in the file of this patent

UNITED STATES PATENTS

| 2,311,548 | Jacobson et al. | Feb. 16, 1943 |
| 2,613,184 | Catlin | Oct. 7, 1952 |
| 2,737,496 | Catlin | Mar. 6, 1956 |

FOREIGN PATENTS

| 467,402 | Great Britain | June 11, 1937 |